United States Patent
Qiu et al.

(10) Patent No.: US 7,814,193 B2
(45) Date of Patent: Oct. 12, 2010

(54) DISTRIBUTING USER ENDPOINT REGISTRATIONS AMONG BORDER ELEMENTS IN A NEXT GENERATION NETWORK

(75) Inventors: Chaoxin Qiu, Austin, TX (US); Robert F. Dailey, Austin, TX (US); Satish Parolkar, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 130 days.

(21) Appl. No.: 12/116,036

(22) Filed: May 6, 2008

(65) Prior Publication Data

US 2009/0282137 A1 Nov. 12, 2009

(51) Int. Cl.
*G06F 15/173* (2006.01)
(52) U.S. Cl. .................. 709/223; 709/244; 709/241; 709/225; 709/224; 709/235; 709/238; 709/239; 709/203; 709/240; 370/401; 370/352; 370/238; 370/400; 370/351; 370/354
(58) Field of Classification Search .............. 709/223, 709/239, 241, 244, 245, 225, 235, 240, 238
See application file for complete search history.

(56) References Cited

U.S. PATENT DOCUMENTS 7,620,053 B2 * 11/2009 MeLampy et al. ..... 370/395.31

2004/0133677 A1 * 7/2004 Paul et al. ................ 709/225
2007/0233896 A1 10/2007 Hilt et al.

OTHER PUBLICATIONS

ATIS Next Generation Network (NGN), Part III: Standards Gap Analysis, Issue 1.0, May 2006, Alliance for Telecommunications Industry Solutions, Washington, DC, USA.
Spector, Dr. Alfred Z., IT Meets Telecom—The Next Generation, www.comsware.org/2006/spectorcomsware2006public.pdf, IBM 2006.
CableLabs PacketCable™ 2.0, Request for Information, www.packetcable.com/downloads/PacketCable_2.0_RFI.pdf, Jun. 4, 2007, Cable Television Laboratories, Inc., Louisville, CO, USA.

* cited by examiner

*Primary Examiner*—Jude J Jean Gilles
(74) *Attorney, Agent, or Firm*—Jackson Walker L.L.P.

(57) ABSTRACT

Disclosed methods of achieving load balancing among a plurality of border elements in a next generation networks (NGN) communication network include a method for processing and user endpoint originated messages (UEOM), such as a register or invite message, generated by a user endpoint. A work load information data structure indicative of a first border element's work load and a second border element's work load is maintained when the border elements exchange work load information. Based on the work load information, a first border element responds to a UEOM by either (1) accepting the UEOM for first border element processing, (2) determining whether to accept the UEOM for first border element processing or redirect the UEOM to a second border element for second border element processing, or (3) rejecting the UEOM.

23 Claims, 9 Drawing Sheets

| BE | Load update time | Normalized registered UEs | Normalized active calls | CPU % | Overall load |
|---|---|---|---|---|---|
| BE #1 | Time stamp #1 | 41% | 50% | 47% | 50% |
| BE #1 | Time stamp #2 | 42% | 55% | 54% | 55% |
| BE #1 | Time stamp #3 | 40% | 57% | 65% | 65% |
| BE #2 | Time stamp #1 | 20% | 28% | 30% | 30% |
| BE #2 | Time stamp #2 | 24% | 26% | 35% | 35% |
| BE #2 | Time stamp #3 | 22% | 29% | 39% | 39% |
| BE #3 | Time stamp #1 | 60% | 65% | 71% | 71% |
| BE #3 | Time stamp #3 | 70% | 69% | 73% | 73% |

FIG. 5

| BE | Load State Variable | Overall load |
|---|---|---|
| BE #1 | YELLOW | 50% |
| BE #2 | GREEN | 35% |
| BE #3 | RED | 73% |
|  |  |  |
|  |  |  |
|  |  |  |
|  |  |  |

DISTRIBUTING USER ENDPOINT REGISTRATIONS AMONG BORDER ELEMENTS IN A NEXT GENERATION NETWORK

BACKGROUND

1. Field of the Disclosure

The present disclosure relates to communication networks and, more particularly, to load balancing in such networks.

2. Description of the Related Art

Next generation networks (NGNs) may employ border elements at the network edge in a distributive fashion to provide access points for millions of user endpoint devices. Border elements are required to do substantial processing and can sometimes become a congestion point in NGNs.

BRIEF DESCRIPTION OF THE DRAWINGS

FIG. 5 illustrates selected portions of exemplary work load information data points that may be transmitted among a set of border elements;

FIG. 7 illustrates selected portions of an exemplary work load information data structure that may be maintained on one or more border elements.

DESCRIPTION OF ILLUSTRATED EMBODIMENTS

Figure 1:
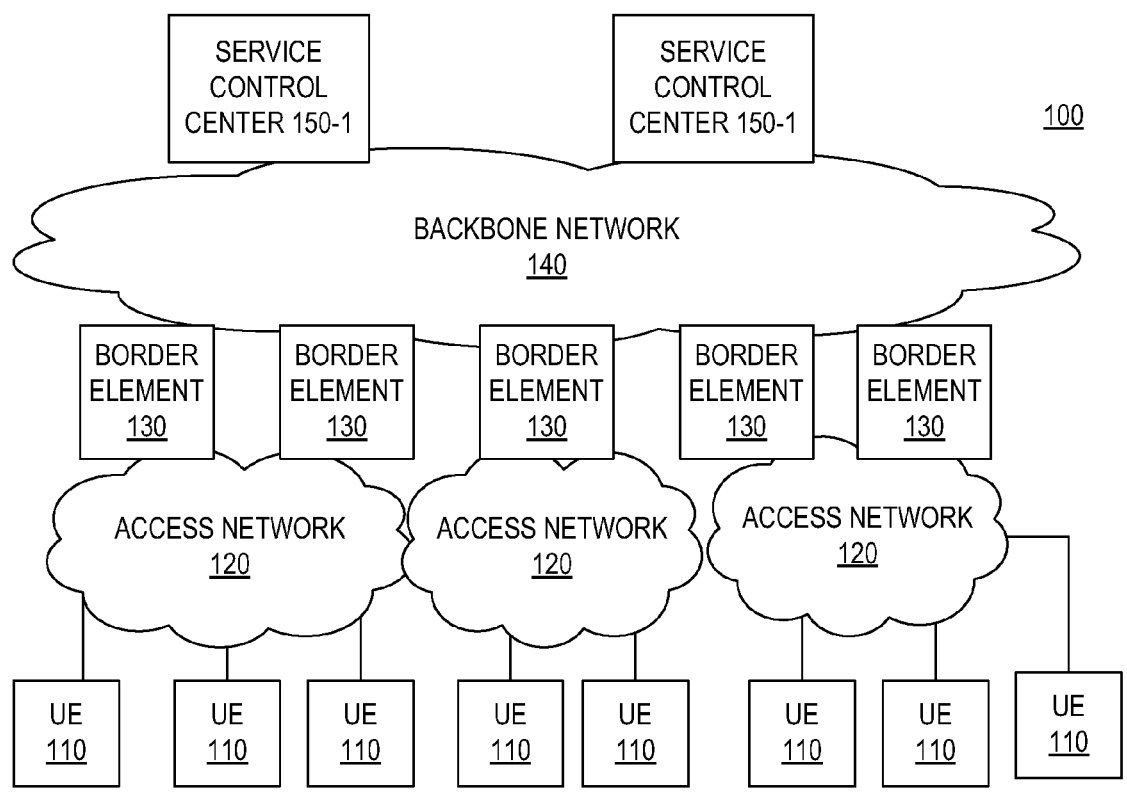
FIG. 1 is a block diagram of selected elements of an embodiment of a communication network.

In one aspect, methods of achieving load balancing among a plurality of border elements in an NGN communication network are disclosed. The NGN communication network may be implemented as a Session Initiation Protocol (SIP) compliant Voice over Internet Protocol (VoIP) network. Embodiments of the disclosed methods may include methods for processing messages generated by a user endpoint (UE). The messages that are processed according to the disclosed methods include, as examples, REGISTER messages, also referred to herein as registration requests, and INVITE messages that are not part of any existing dialog, also referred to herein as "new dialog requests." In general, a new dialog request includes a SIP request message that is initiated by an UE and does not belong to all other existing dialogs. Registration requests and new dialog requests are collectively referred to herein as UE-originated messages (UEOMs).

In one embodiment, a disclosed method of processing a UEOM includes maintaining first work load information indicative of a border element's work load. A border element's work load reflects a border element's capacity to register new user endpoints and/or the border element's capacity to establish new sessions. The method, when executed by a border element referred to herein as a first border element, may include responding to receiving a UEOM from a user endpoint by either (1) accepting the UEOM for processing by the first border element when the first work load information indicates first border element work load below a first threshold or (2) determining, based on the first work load information and second work load information indicative of work load of a second border element, whether to (a) accept the UEOM for first border element processing, (b) redirect the UEOM to a second border element for processing by the second border element, or (c) reject the UEOM.

The first work load information that is maintained by the first border element may include various work load information components such as a registered user component that indicates the first border element's capacity to register new user endpoints, an active session component that indicates the first border element's capacity to establish or support new sessions, sometimes referred to herein as calls, and a central processor component indicative of a work load of the first border element's central processor. The determination of how to process a UEOM may be based on "overall" work load information, where the overall work load information is determined from, or otherwise based on, any one or more of the work load information components. The overall work load information may represent, as examples, a maximum of the work load information components, a weighted or unweighted average of the work load information components, and so forth. To address differences in absolute capacities of different border elements, the work load information components and the overall work load information may be normalized expressions. Moreover, where a particular implementation includes border elements or versions of border elements provided by multiple vendors, different border elements may use different methods to calculate the overall work load.

In some embodiments, the first work load information and the second work load information are maintained in a work load information data structure such that the work load information data structure contains work load information for all network border elements that are participating in the load balancing effort. The work load information data structure may be stored locally by the first border element and at the second border elements or stored on network attached storage accessible to the first border element and the second border elements. In these embodiments, determining how to process a UEOM includes accessing a work load information data structure. The border elements may, from time to time, send work load information to the other border elements. The first border element, for example, may send its work load information to the second border elements from time to time and receive second work load information from one or more of the second border elements from time to time. When the first border element receives second work load information, it incorporates it into the work load information data structure so that the work load information data structure reflects the current or recent work load state of some or all of the border elements in a communication network. In some embodiments, a border element sends its work load information by multicasting the work load information to a multicast group made up of the participating border elements. In other embodiments, work load information may be unicast to one or more of the participating border elements.

In some embodiments, redirecting the UEOM occurs only if the work load of a second border element is less than the work load of the first border element. Redirecting a UEOM includes identifying a redirect-to border element from the set of participating second border elements.

Some embodiments may employ a tiered work load redirection technique in which, for example, the work load "state" of any border element is represented by a work load state variable that may take on three values, for example, "GREEN," "YELLOW," and "RED." When a work load of the first border element is below a first threshold, the first border element is operating in the GREEN state, i.e., the first border element is a GREEN sate border element, and the first border element processes UEOMs unconditionally. When the first border element's work load is above a critical threshold, the first border element is in the RED state and the first border element is prohibited from processing any new UEOMs.

The first border element redirects all UEOMs to a second border element if there are any GREEN state or YELLOW state second border elements. If a RED state first border element receives a UEOM and all participating second border elements are in a RED state themselves, the first border element may either reject the UEOM or select the RED state border element with the lowest work load to process the UEOM. In some embodiments, the first border element may transmit a reject message back to the UE when the first border element rejects a UEOM. The reject message may include a re-try time indicating when the rejected UE can re-try the same request. In SIP compliant embodiments, for example, a re-try time may be implemented using the "Retry-after" header When the first border element work load state is YELLOW, the first border element may "throttle" its processing of new UEOMs by, as an example, accepting a specified percentage of UEOMs for first border element processing and redirecting the remaining UEOMs to a GREEN state second border element if one is available or to a YELLOW state second border element if the work load of the YELLOW state second border element is lower than the work load of the first border element. If no GREEN state or suitable YELLOW state second border element is available, the first border element may process the UEOM itself. In some embodiments, the throttling policy is applied uniformly to all UEOMs without regard to whether a UEOM is a registration request or a new dialog request. In other embodiments, the throttling policy is implemented non-uniformly between registration requests and new dialog requests. For example, a throttling policy may process new dialog requests from UEs and may throttle registration requests.

The designation of the various work load states may incorporate "hysteresis" to reduce "thrashing" of the work load state. As used herein, hysteresis of state transitions refers to a scheme in which the current work load state of a border element is determined by the current work load and the existing work load state. This hysteresis effect may be implemented using different thresholds for entry into a state and exiting from a state. For example, an implementation may recognize a GREEN state to YELLOW state transition when a GREEN state border element's work load exceeds 70% and a YELLOW state to GREEN state transition when a YELLOW state border element's work load drops below 60%. Similarly, YELLOW state to RED state transitions may occur at 95% work load, as an example, and RED state to YELLOW state transitions may occur at 90% work load. Some embodiments may differentiate the handling of UEOMs for different types of UEOMs. For example, some embodiments may differentiate between registration requests and new dialog requests when a border element is in a RED state and/or YELLOW state. A RED state or GREEN state border element may, for example, attempt to re-direct registration requests whereas a border element in red or yellow state may reject new dialog request messages.

In another aspect, a disclosed computer program product for a session border controller includes computer executable instructions, stored on a computer readable medium, for handling UEOMs from a user endpoint in a NGN. In some embodiments, the NGN is a SIP compliant VoIP network and the session border controller is a SIP compliant session border controller. The computer program product may include instructions to maintain a work load information data structure containing first work load information indicative of work load for a first session border controller and work load information indicative of work load for a second session border controller The first session border controller and second session border controller are distinct entities having distinct exposed IP addresses and/or distinct exposed Domain Name Server (DNS) names. In at least some embodiments, the terms "first" and "second" as applied to the session border controllers are used merely to differentiate two or more session border controllers that may be functionally equivalent and not to promote or define a primacy or other hierarchy of one versus the other. In some contexts, the first session border controller may be referred to as a local session border and the second session border controller may be referred to as a remote border controller to emphasize implementations in which the first session border controller is closer in logical distance, geographical distance, or another measure of proximity to a UE other than the second session border controller. Therefore UEs assigned to a session border controller as the first session border controller may use or be assigned to different session border controller as the second session border controller.

In some embodiments, a session border controller will send its work load information to all other session border controllers, and will receive work load information from all other session border controllers. In these embodiments, a session border controller is operable to store work load information indicative of the loading of its own and all other session border controllers. As a simplified example using a network with just two session border controllers, the first session border controller may send, from time to time, first work load information to the second session border controller and the first session border controller may receive from time to time work load information from the second session border controller so that the first session border controller may maintain a work load information data structure that indicates the loading of both session border controllers and, moreover, the second session border controller may do the same. The session border controllers may update their work load information data structures each time work load information is received from the others. A session border controller may store its work load information data structure locally or remotely, e.g., on network attached storage.

In at least some embodiments, the identity of the second session border controller is determined dynamically so that, for example, the second session border controller may represent a certain session border controller at a first point in time while, at a second point in time, the identity of the second session border controller may be another controller. The dynamic determination of second border controllers ensures that, at any point in time, redirected UEOMs are redirected to the most appropriate session border controller. In yet another embodiment, session border elements in an NGN can be partitioned into several groups and the described load balancing processing can be configured to work within each group but not across the different groups. For example, a national NGN can be configured in such way that all session border elements are partitioned into several regional groups. Within each regional group, each session border element may exchange its work load information with other session border elements in the same group and redirect UEOMs to other session border elements within the same group based on the load balancing policy. Moreover, the load balancing policy applicable to one group may differ from the load balancing policy applicable to another group. For example, the thresholds for determining RED, YELLOW, and GREEN states may differ between two or more groups.

The first session border controller may respond to receiving a UEOM from a user endpoint by determining, based on information in the work load information data structure, whether to accept the UEOM for first session border controller processing or redirect the UEOM to the second session border controller. The work load information data structure may include a first work load state variable indicative of a work load state of the first border element and a second work load state variable indicative of a work load state of the second session border controller. Determining whether to accept or redirect a UEOM may be based on the respective values of the work load state variables.

The instructions to send first work load information may include instructions to multicast the first work load information to a multicast group of all participating session border controllers. The session border controllers, user endpoint, and UEOM may all be SIP compliant. In these embodiments, redirecting a UEOM may include responding to the UEOM with a redirect message that includes a Universal Resource Indicator (URI) of the second border element in a "contact" field of the redirect message header.

In some embodiments, the instructions to respond include instructions to accept a UEOM for first border element processing when a first border element is in a GREEN state, e.g., first border element work load is below a first threshold. When a first border element is in a YELLOW state, the first border element may employ "throttling" through instructions to accept a specified percentage of UEOMs for first border element processing. The instructions to respond may include instructions to redirect a UEOM only if a second border element with less work load can be found and instructions to reject the UEOM when the first border element and all other border element are both in a RED state.

In another aspect, a disclosed SIP-compliant session border controller or other type of border element operable for use in establishing a communication session includes a processor, a network interface adapter (NIC), and a storage resource accessible to the processor. The NIC enables communication between the processor and a VoIP or other type of communication network. The storage resource includes executable code for periodically sending first work load information to second border elements. The first work load information is indicative of first border element work load. The executable code further includes code for periodically receiving second work load information from other second border elements and responding by incorporating the second work load information into a work load information data structure. The second work load information is indicative of the registration capacity of second border elements. The executable code may further include code for responding to receiving a UEOM from the user endpoint by making a handling determination based on work load information in the work load information data structure. The handling determination may be to accept the UEOM for first border element processing or redirect the UEOM to a second border element for second border element processing. The first border element may be a SIP compliant session border controller and the communication network may be a SIP compliant VoIP network. Redirecting a UEOM may include sending a SIP compliant redirect message to the user endpoint where a Contact field in a header of the redirect message includes a URI corresponding to the second border element. The first session border controller can also include a value for the SIP Expires header to tell the user endpoint how long it should refrain from sending to the first session border controller.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram of selected elements of an embodiment of a communication network 100. In the embodiment described herein, communication network 100 is a NGN. An NGN is a packet-based network operable to provide telecommunication services in which service-related functions are independent from underlying transport-related technologies. NGNs are access indifferent networks that facilitate consistent and ubiquitous provision of services to users.

In the embodiment depicted in FIG. 1, communication network 100 includes user endpoints 110, border elements 130, and service control centers 150. In some embodiments, communication network 100 is suitable for establishing multimedia sessions including, as an example, VoIP telephony sessions. VoIP employs the SIP to establish sessions. In the embodiment depicted in FIG. 1, user endpoints 110, border elements 130, and service control centers 150 may all support SIP for establishing multimedia sessions.

In IMS-based implementations of communication network 100 or another SIP based implementation, user endpoints 110 may represent any of a variety of data communications devices operable to act as an originating SIP user agent. Examples of devices suitable for use in this embodiment of communication network 100 include VoIP handsets, Third Generation (3G) cellular telephones, software-based endpoint (e.g., soft-phones) in personal computers, both wireless and wireline, and so forth. The border elements 130 represent session border controllers or other types of devices that reside between an access network 120 to which user endpoints connect and a core network or backbone network 140 to which the service control centers 150 connect.

As emphasized in the implementation of communication network 100 depicted in FIG. 1, many border elements 130 may be deployed at the edges of access network 120 and backbone network 140 in a distributed manner to provide access points for a very large number of user endpoints 110. The border elements 130 connect user endpoints 110 to a relatively small number of service control centers 150. As an NGN, communication network 100 supports the well known and pervasive Internet Protocol (IP). IP-based addressing makes it possible for user endpoints 110 to access any one of the service control centers 150 via any one of the border elements 130. This feature enables communication network 100 to provide geographic redundancy for real-time services using Dynamic Host Control Protocol (DHCP) and/or the DNS. IP compliant embodiments of communication network 100 may support a variety of transport protocols including, as examples, transport control protocol (TCP), user datagram protocol (UDP), real-time transport protocol, (RTP), or a combination thereof In at least some embodiments, communication network 100 is an access agnostic network that enables user endpoints 110 to access network resources over a variety of access networks 120. For example, access networks 120 may include radio access networks (RANs), conventional IP networks, or even legacy telephony devices via the public switched telephone network (PSTN) in conjunction with intervening media and control gateways that are not depicted in FIG. 1.

While the service control centers 150 are generally scalable to accommodate a large number of subscribers, border elements 130 may be designed for deployment in smaller access offices and may not perform as well when confronted with very large numbers of subscribers. Moreover, border elements 130 as implemented in NGNs may have to support various processor intensive functions including, as examples, application level security, signaling interworking, media flow management, and network traffic management.

In addition, fault events including, as examples, power failures in service areas, or power/connection failures in access offices and service control centers, can result in bursts of re-connect attempts by a large number of user endpoints 110 to some border elements 130. Such burst events may cause severe overloads in at least some border elements 130 and compromise the fault resilience of communication network 100 despite any over-provisioning of service control centers 150 to achieve geographic redundancy. Some embodiments of communication network 100 are implemented with border elements 130 that include dynamic load balancing functionality to beneficially reduce the likelihood or frequency with which any individual border element 130 might become a congestion point in communication network 100.

Figure 2:
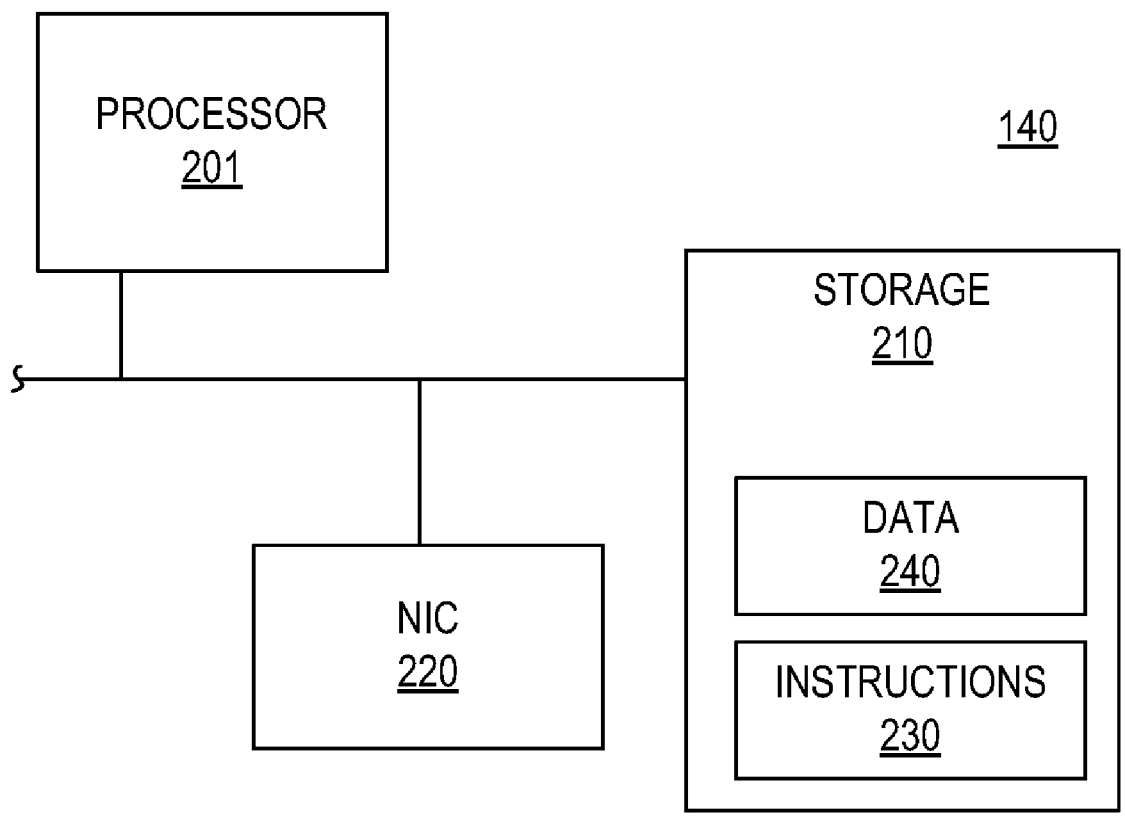
FIG. 2 is a block diagram of selected elements of an embodiment of a border element in a communication network.

The border elements 130 may be implemented as general purpose data processing systems, dedicated Internet appliances, or in other configurations. Referring to FIG. 2, a block diagram depicts selected elements of one embodiment of a border element 130. In the depicted embodiment, border element 130 includes a processor 201 that has access to a storage resource 210 and to one or more network adapters, also referred to as NIC 220. NIC 220 enables processor 201 to communicate with other elements of communication network 100. NIC 220 may include support for one or more network protocol stacks, including a TCP/IP protocol stack that facilitates network communication. The storage resource 210 represents any one or more of conventional and tangible computer readable storage mediums. The storage mediums employed by storage 210 may include volatile storage including random access storage or system memory as well as nonvolatile or persistent storage such as hard disks, flash memory, and so forth.

Regardless of how it is implemented physically, storage resource 210 may include information including instructions 230 and data 240. Instructions 230 represent software or programs that processor 201 may execute and data 240 represents databases or other data structures that the programs in instructions 230 may access and/or modify. For example, the border elements 130 as described herein are implemented with a distributed dynamic load balancing functionality that enables communication network 100 to distribute at least some types of network traffic in a manner that alleviates system overloads that might otherwise occur.

In at least some embodiments, dynamic load balancing of the workloads in border elements 130 includes a multicast technique enabling border elements 130 to exchange work load information and maintain a work load information data structure. A registration processing algorithm enables a border element 130 to decide when to process user endpoint requests locally, when and where to redirect some user endpoint requests, and when to reject user endpoint requests, all based on the work load information data structure. The dynamic load balancing functionality may further leverage SIP supported functions to enable a first border element to redirect a user endpoint UEOM to a second border element 130 when it can find a second border element 130 that currently has lower work load than the first border element 130, i.e., the border element 130 that first received a UEOM from a user endpoint 110.

To support dynamic load balancing, at least some embodiments of a border element 130 may execute or otherwise perform two methods substantially coextensively. A border element 130 may execute a first method to maintain its own work load statistics, referred to herein as local work load statistics, and exchange work load statistics with other border elements so that each participating border element 130 may have a database that represents a snapshot of work load on at least some of the border elements 130 in communication network 100. A border element 130 may further execute a second method to handle UEOMs wherein the handling of UEOMs includes determining whether to process a UEOM locally, redirect the UEOM to a remote border element, or reject the UEOM entirely. The method for handling incoming UEOM requests may depend largely on the information in the global work load database. In the embodiments described herein, at least some of the border elements 130 maintain the global work load database locally while, in other implementations, one or more border elements 130 may be referred to a network hosted global work load database. A locally maintained database offers the promise of improved performance, but a hosted database may reduce the storage requirements of any individual border element 130 in the event that the storage requirements of the global work load database become extensive.

At least some embodiments of the load balancing functionality disclosed herein may include elements that are implemented as computer program products. A computer program product is a set or sequence of computer executable instructions, such as the instructions 230, stored on a computer readable medium such as storage 210.

Figure 3:
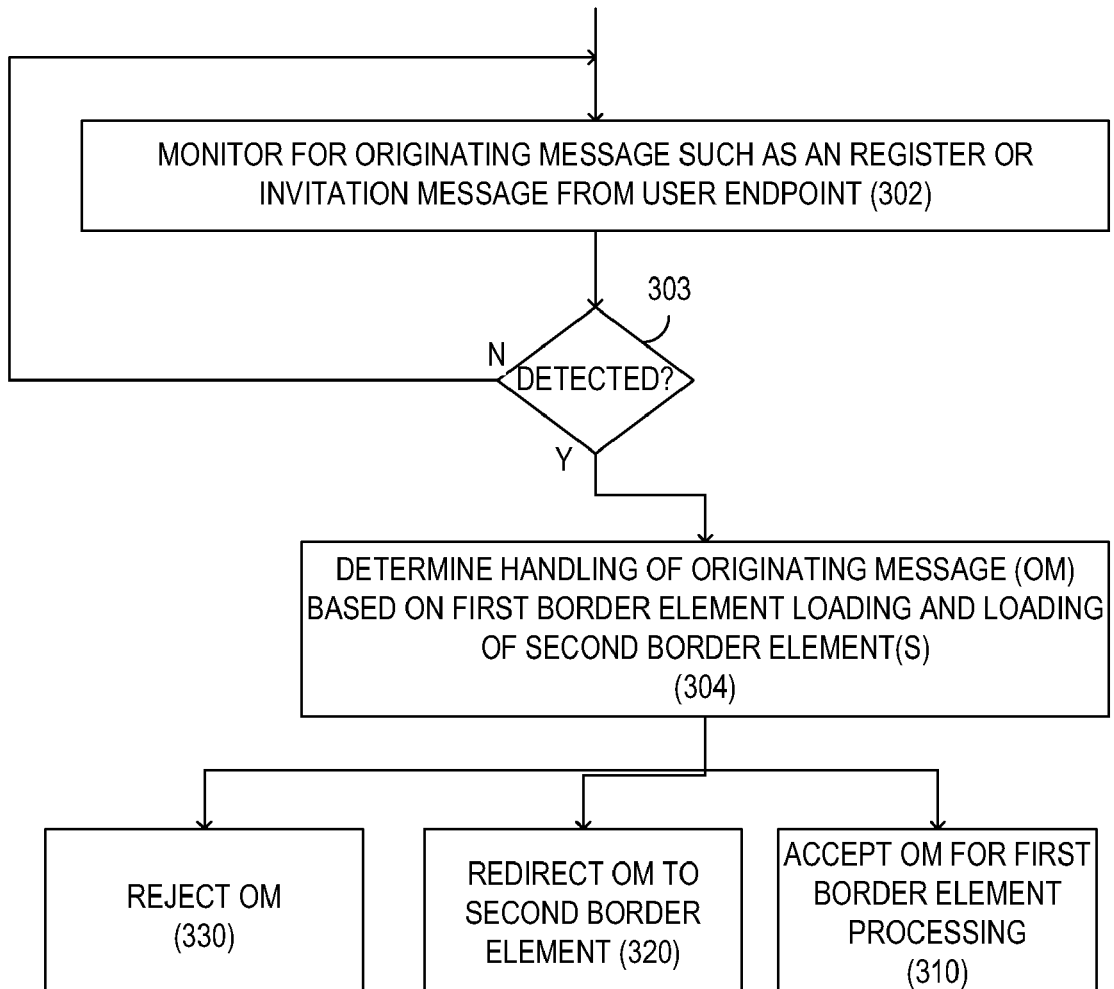
FIG. 3 is a flow diagram of selected elements of a method of handling user endpoint-originated messages received by a border element.

Referring now to FIG. 3, a flow diagram depicts selected elements of a method 300 of handling UEOMs from a user endpoint 110 in NGN implementations of communication network 100. As depicted in FIG. 3, method 300 includes a block 302 in which a resource such as a border element 130 monitors its access network interfaces for a UEOM from a user endpoint 110. When a UEOM is received, method 300 includes deciding (block 304) whether to process locally (block 310) the UEOM, redirect (block 320) the UEOM to a remote border element, or reject (block 330) the request. Determining how to handle a UEOM in block 304 may include determining how to handle the UEOM based on local work load of the border element as well as remote work load of one or more remote border elements. In some embodiments, the message handling in block 304 may also be based, at least in part, on the type of message being handled so that, as an example, new dialog requests and registration requests are handled differently. As suggested previously, message handling block 304 may include prioritizing the types of UEOMs to redirect and the types of UEOMs to reject.

Whereas, for example, registration requests may be prioritized for redirection, new dialog requests may be prioritized for rejection.

To support the UEOM handling depicted in FIG. 3, at least some embodiments of border elements 130 employ a method of maintaining local work load information and distributing the local work load information among the border elements 130 so that each participating border element 130 may maintain or have access to a database of global work load information.

Figure 4:
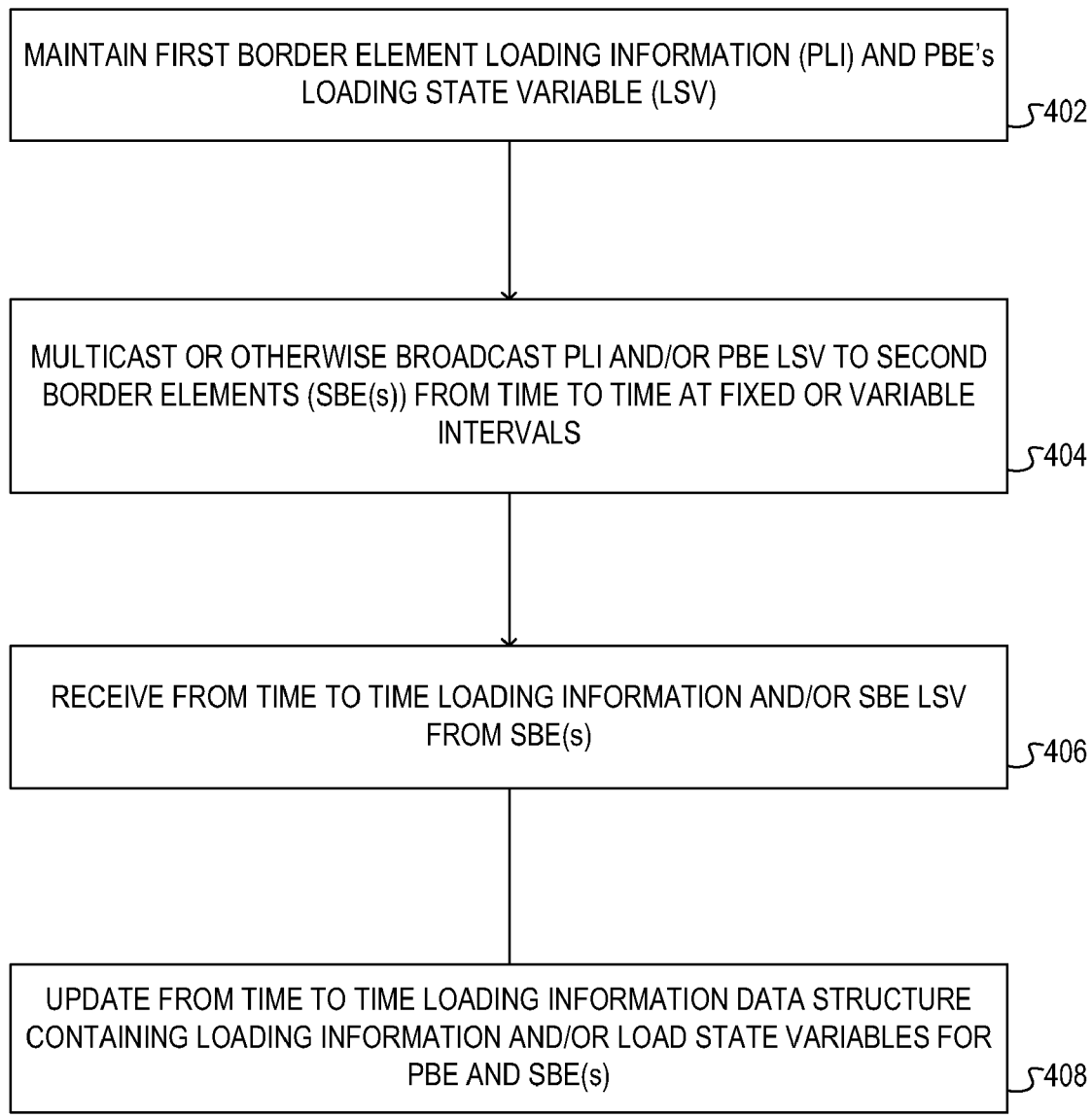
FIG. 4 is a flow diagram of selected elements of a method of maintaining a work load information data structure for use by a border element.

Referring now to FIG. 4, a flow diagram depicts selected elements of a method 400 for generating work load information. Method 400 as shown may represent a method performed by any one or all of the border elements 130. In the depicted embodiment, method 400 includes a border element maintaining (block 402) local work load statistics and deriving from the load statistics a value for a state variable referred to herein as the work load state. The work load state variable may be employed to represent or characterize the work load state in a data efficient manner.

The work load state of any border element 130 may be determined from one or more work load parameters indicative of the ability of the border element to process new UEOMs. A border element 130 may determine its instantaneous work load statistics periodically at fixed or variable intervals. Some embodiments of border elements 130 may log or otherwise store these instantaneous readings to produce an average, weighted average, or some variation thereon, to smooth out the potentially rapid and substantial changes in the work load that may occur.

FIG. 5 depicts an exemplary sequence of instantaneous load values data point 502 that might be generated by a set of border elements 130. In the depicted embodiment, each data point 502 includes a border element ID 510, a time stamp 512, three values reflecting different measures of work load, and an overall work load value 530. In the depicted implementation, the different measures of work load employed include a work load measure 520 based on the number of user endpoints currently registered with the border element, a work load measure 522 based on the number of active calls being handled by the border element, and a work load measure 524 based on the work load of the border element's processor. In the depicted embodiment, an overall work load value 530 is determined from the three work load parameters 520, 522, and 524. In the depicted embodiment, the overall work load value 530 represents the maximum value of the three individual work load parameters 520, 522, and 524. Other embodiments may employ other methods to determine overall work load value 530. In some embodiments, for example, the instantaneous overall work load value 530 is averaged, on either a weighted or unweighted basis, with the N most recent values of overall work load. In these embodiments, this time-averaging may beneficially smooth out the rate of change of overall work load following a possible short burst of the work load data.) In some embodiments, border elements 130 are sufficiently robust to continue functioning when data points are lost due to network transport or other reasons. In FIG. 5, for example, it appears that one or more messages indicating work load values for BE #3 at time stamp #2 have been lost. In such situations, determination of the work load value for BE #3 at time stamp #3 may be based on a policy for responding to lost data points. For example, if the work load determination method employs an average mean technique based on the most recent three data points, then the work load of BE#3 at time stamp 2 may be calculated based on the mean of the most recently received two data points instead of three. Similarly, if a weighted average is employed, then the data in time stamp #1 or #3 will be used in the place of missing data point.

As mentioned above, some embodiments of border elements 130 may calculate or otherwise determine a value for a work load state variable based on the load data. A border element 130 may determine the work load state variable based on a single data point 502 or based on some average of two or more data points 502. A border element 130 may assign a value to a work load state variable based, for example, on a comparison of a determined load value and some thresholds for the various states that a border element may be in.

Figure 6:
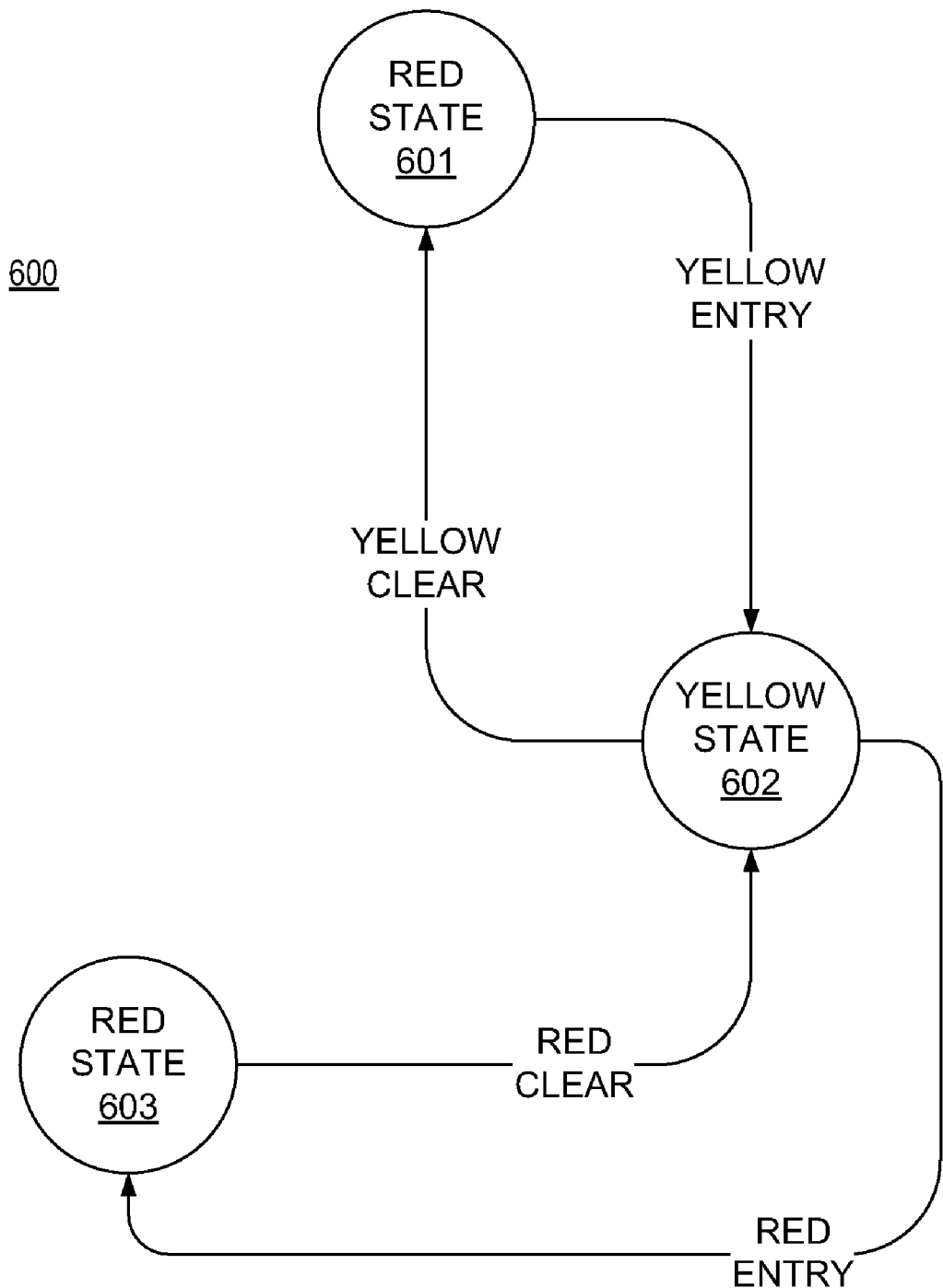
FIG. 6 is a state transition diagram illustrating an embodiment of various work load states of a border element.

Referring to FIG. 6, for example, a state diagram 600 depicts exemplary work load states that a border element 130 may assume in one embodiment. The depicted embodiment employs three states, namely, a GREEN state 601, a YELLOW state 602, and a RED state 603. The GREEN state 601 represents a state of work load that is sufficiently low to permit the border element 130 to accept UEOMs unconditionally. RED state 603 represents the converse, namely, a state of work load that is so high it prevents border element 130 from processing UEOMs locally. Between GREEN state 601 and RED state 603, state diagram 600 includes a YELLOW state 602. In some embodiments, YELLOW state 602 represents a state in which a border element may elect to process the request and may elect not to process the request. Although FIG. 6 depicts three states, other embodiments that employ work load state variables may include more or fewer states.

State diagram 600 further illustrates an embodiment that employs four threshold values to determine state transitions. In the depicted embodiment, a border element that is operating in the GREEN state 601, i.e., a border element in the GREEN state, transitions to YELLOW state 602 when the border element's overall work load is greater than a work load threshold referred to herein as the Yellow Entry threshold. State diagram 600 depicts a transition from YELLOW state 602 to RED state 603 when the overall work load exceeds a second threshold referred to as the Red Entry threshold. State diagram 600 depicts a transition from the RED state 603 to YELLOW state 602 when the overall work load parameter drops below a third threshold referred to as the Red Clear threshold. Finally, state diagram 600 includes a fourth transition from the YELLOW state 602 to the GREEN state 601 when the overall work load is less than a fourth threshold referred to as the Yellow Clear threshold.

The values of the four thresholds may be determined based on historical work load information, predictive work load estimates, other factors, or any combination thereof. The transition thresholds may include some inherent overlap or "hysteresis" to prevent or reduce state "thrashing" in which a border element's work load state changes rapidly in response to minor and normal work load oscillations. Thus, for example, the Yellow Entry threshold may be higher than the Yellow Clear threshold and the Red Entry threshold may be higher than the Red Clear threshold.

Returning now to FIG. 4, a method as depicted includes periodically, at fixed or variable intervals, transmitting (block 404) the instantaneous load statistics 502, the value of the work load state variable, some other information indicative of work load or a combination thereof. In some embodiments, the transmitted information may include the value of the work load state variable as well as a work load value such as the overall work load.

Method 400 as depicted further includes receiving (block 406) periodically at fixed or variable intervals, work load information from one or more second border elements 130, which may be remotely located. Like the work load information transmitted by a locally located first border element 130 to one or more remotely located second border elements, the work load information received from the second border elements may include the instantaneous work load values 502, a value of a work load state variable, or a combination thereof For example, the work load information received from the remote border elements 130 may include a value of a work load state variable as well as a work load value such as the overall work load.

In some embodiments, the distributing of work load information among the border elements 130 includes distributing the work load information by multicasting (or unicasting, or broadcasting). In these embodiments, a list of all border elements 130 and their corresponding URIs is maintained. An IP multicast group may then be defined and all of the border elements 130 invited to join. When a border element 130 transmits its work load information, the border element 130 may transmit the information using a multicast format with the multicast group corresponding to the global set of border elements 130.

In some embodiments, each border element 130 receives work load information from time to time from the other border elements and maintains its own local work load statistics and work load state variable. In this manner, all border elements 130 may have the same or substantially the same information regarding the work load statistics and/or the work load state of each of the border elements 130. As depicted in FIG. 4, method 400 may further include a border element 130 updating (block 408) a work load information data structure from time to time, e.g., when work load information is received from other border elements. In some embodiments, the work load information data structure provides a snapshot of the work load and/or work load state of all participating border elements in a network.

FIG. 7 depicts selected portions of an exemplary work load information data structure 700. In the depicted implementation, work load information data structure 700 includes a set of rows 702 corresponding to one of the border elements in the network. For each border element, the corresponding row 702 in table 700 includes two values, namely, an overall work load value 710 and a work load state variable value 712. Other embodiments of work load information data structure 700 may include more or fewer values per each border element. A border element may use various algorithms to determine the values for each row 702 based on the work load information data points received. For example, a border element may determine work load value 712 based on a rolling average of the most recently received data points, a weighted average, or any suitable algorithm. In other embodiments, a border element may use the most recently received data point to determine the work load value 712 and the work load state value 714.

Figure 8A:
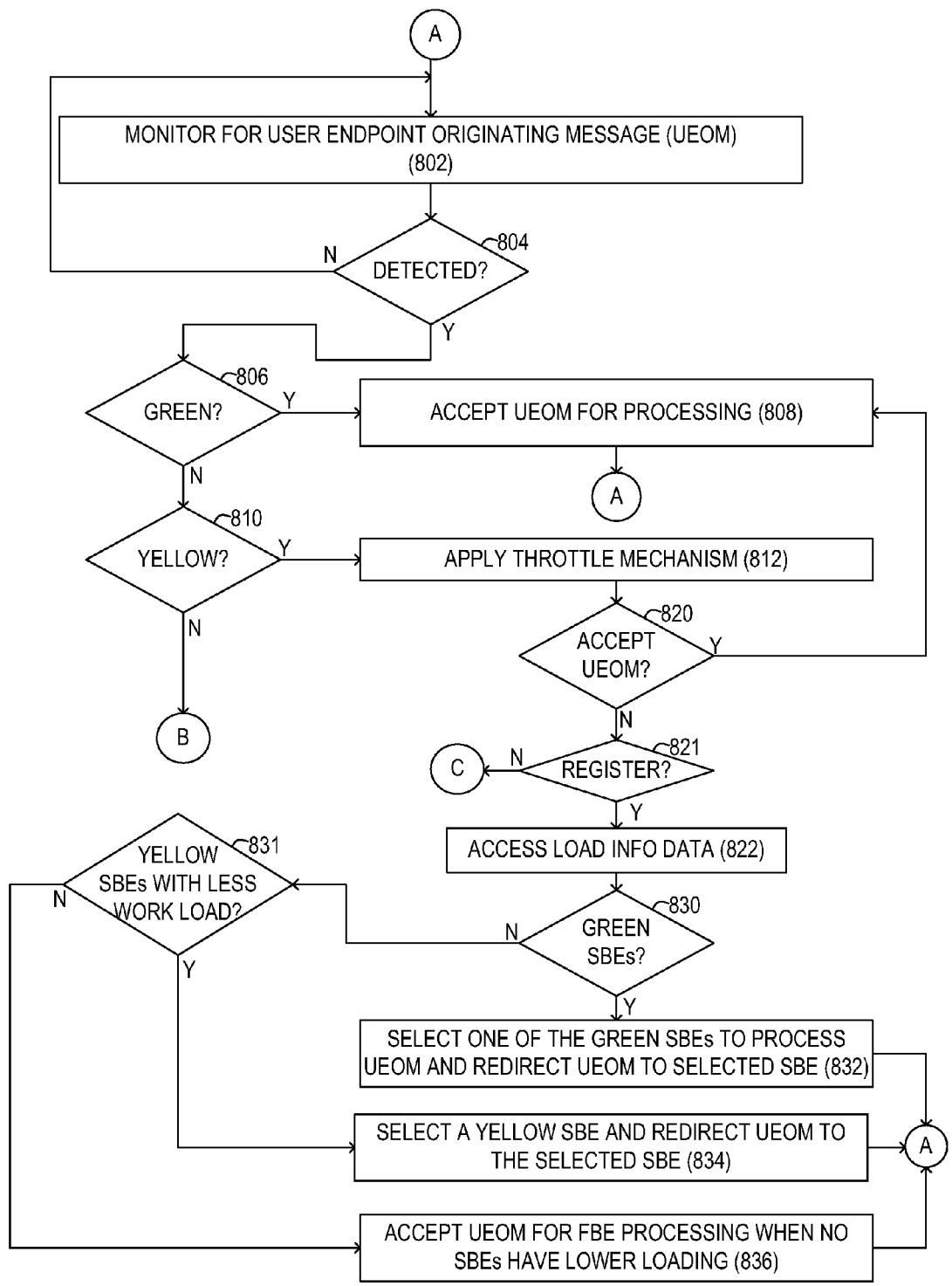
FIGS. 8a and 8b illustrate a flow diagram of selected elements of an embodiment of a method of handling user endpoint-originated messages by a border element.
Figure 8B:
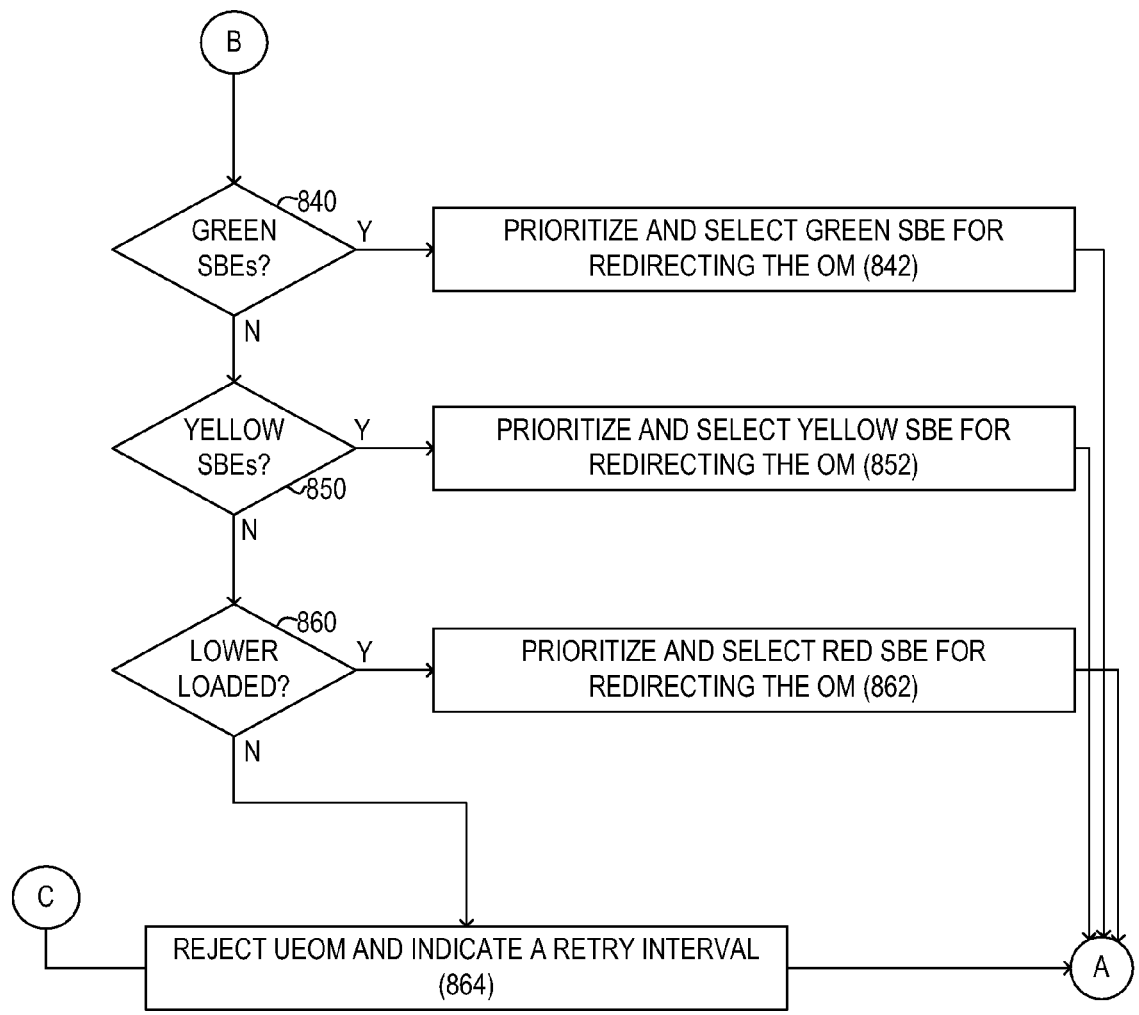

Turning now to FIGS. 8a and 8b, a flow diagram depicts selected elements of a method 800 for handling UEOMs by a border element 130 in the communication network 100. In the depicted embodiment, a border element monitors (block 802) for a UEOM request from a user endpoint 110. When a UEOM is detected (block 804), the depicted embodiment of method 800 implements a processing handling policy as follows. If (block 806) the border element that detects the UEOM, i.e., the first or local border element is operating in a GREEN state, the border element may accept (block 808) and process the UEOM automatically and unconditionally. If the border element is not in the GREEN state, additional processing is performed to determine proper handling.

If (block 810) the first border element is in the YELLOW state, it may employ a "throttle" to constrain the rate of new UEOMs being processed locally and/or the number of active calls that exist locally. Throttling in this sense may be achieved by enabling the first border element to accept a specified percentage of the incoming UEOMs and to decline the remainder.

If a border element employs throttling and the border element is in the YELLOW state when a UEOM arrives, the border element may apply (block 812) a throttling mechanism or algorithm, e.g., a random number generator, to determine (block 820) whether to accept (block 808) the origination message. The throttling determination may, alternatively, be based on determining whether accepting the UEOM will increase the percentage of recently accepted UEOMs above the throttle percentage and, if so, then not accepting the UEOM. In some embodiments, the throttling policy can be implemented to process new dialog requests from UEs and to throttle registration requests. If the throttling percentage cannot be met, the throttling policy may then employ throttling of new dialog requests.

If, in block 820, a UEOM is not accepted by the first border element after throttling, the first border element may perform an optional block 821 to differentiate the handling of UEOMs based on the type of UEOM. In the depicted implementation, method 800 attempts to re-direct registration requests if possible. In the depicted embodiment, for example, method 800 determines in block 821 whether the UEOM is a REGISTER request. If the UEOM is not a REGISTER request, method 800 as shown jumps to the processing indicated by block 864 described below. In this embodiment, new dialog requests and other non-REGISTER requests are rejected when the first border element does not accept the message for processing. Rejecting new dialog requests may be preferable to redirecting them to other border elements in implementations, including all SIP compliant implementations, where a user endpoint can only register with a single border element and can only send invitations via the border element with which the user endpoint is registered. If, in block 821, method 800 determines that the UEOM is a SIP compliant REGISTER message or other type of registration request, method 800 as shown retrieves or otherwise accesses (block 822) the load information data base to determine if any remote border elements are in a GREEN state. If (block 830) one or more remote border elements are in the GREEN state, method 800 includes selecting (block 832) a remote border element to process the UEOM. If there are multiple remote border elements in the GREEN state, prioritizing them for purposes of selecting a border element may include ordering the remote border elements based on their overall work load.

Alternatively, selection of a remote border element in block 832 may include determining a geographic location of the remote border element and deliberately favoring a border element that is either geographically close to the local border element or geographically distant from the local border element depending upon a prevailing motivation. Redirecting UEOMs to nearby border elements may improve redirection performance. Redirecting UEOMs to geographically diverse border elements may alleviate excessive overwork load following burst events and the like.

Similarly, selecting a remote border element in block 832 may be based on location information for the requesting user endpoint and the remote border elements. The location of border elements can be configured when a border element is deployed. The location of user endpoints can be made available to a border element if the user endpoint has GPS and can use enhanced SIP protocol to convey the location information in a UEOM including, for example, a SIP REGISTER message. Alternatively, the location of a user endpoint can be based on the NPA-NXX of the user endpoint telephone number, which is available in the SIP REGISTER message. In this case, a border element simply needs to configure a table to match the NPA-NXX to the closest border elements. Note that the NPA approach, while relatively easy to implement, may become of less usefulness as nomadic users change their locations, but not their phone numbers.

If, in block 830, a local border element determines that there are no remote border elements in the GREEN state, method 800 as shown may include determining (block 831) whether there are any YELLOW state second border elements with a lower work load than the first border element. If there are one or more YELLOW state second border elements that have a lower work load than the first border element, method 800 selects, in block 834, one of the YELLOW state second border elements and redirects the UEOM to the selected second border element. If method 800 determines in block 831 that there are no remote border elements in the YELLOW state with less work load than the local border element, the depicted embodiment of method 800 includes accepting the UEOM for processing locally in block 836.

If method 800 determines in block 810 that local border element is operating in the RED state, method 800 branches to block 840 where it determines if there are any remote border elements operating in the GREEN state. If one or more remote border elements are in the GREEN state, the local border element prioritizes among them and selects (block 842) one of them (for redirecting the UEOM). If there are no GREEN state remote border elements in block 840, method 800 includes determining (block 850) whether any remote border elements are in the YELLOW state and, if so, prioritizing (block 852) and selecting a YELLOW state remote border element as described previously. If method 800 determines in block 850 that there are no remote border elements in the YELLOW state, then method 800 identifies (block 860) any remote border elements with work load that is less than the local work load and if so, prioritizes and selects (block 862) one of the remote border elements for redirecting the UEOM. If a local border element is in a RED state and all remote border elements have higher work load than the local state, method 800 may reject (block 864) the UEOM and indicating a retry interval to the requesting user endpoint where the retry interval tells the user endpoint how soon it can re-send the request. A border element may reject a UEOM by returning a SIP "480" message or a SIP "503" message and using a "Retry_after" header to indicate the retry interval. In the depicted embodiment, method 800 also jumps to block 864 following a determination in block 821 that the UEOM is not a registration request as discussed above.

To accommodate the wide variety of border elements 130 that may be implemented across an entire provider network, some embodiments use normalized data when determining and reporting work load statistics and work load state. In some embodiments, for example, the work load statistic values are calculated as percentages. For example, the work load value 520 may be indicated as a percentage of registered user endpoints that the border element may be equipped to handle.

When a border element determines through method 800 that a UEOM is to be re-directed, some embodiments achieve redirection by leveraging SIP messaging standards. For example, a border element may redirect a UEOM to another border element by returning a SIP 301 message to the requesting user endpoint 110. The SIP 301 message should be configured by the local border element so that the border element to whom the UEOM is to be redirected is indicated in the Contact header of the message. SIP admonishes all compliant devices to use the information in the contact field when generating new requests and, accordingly, the user endpoint 110 should generate a new UEOM using the URI of the redirected border element as the contact point. When a user endpoint receives a SIP 301 response to its UEOM, it should use the URI in the contact header to formulate a new UEOM and send the UEOM to the redirected border element. In embodiments that employ SIP 503 Error messages to indicate when a request is rejected, the 503 Error message may include a value in the SIP "Retry-after" header to indicate a retry interval, i.e., how much time must or should elapse before the request can be re-tried.

The described embodiments beneficially reduce overload and congestion in network border elements and provide higher service quality. In addition, the design mitigates service recovery "storms" and provides more robust service recovery and fault tolerance for the network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of processing user endpoint originated messages (UEOMs), comprising:
   maintaining first work load information indicative of a work load of a first border element work load; and
   responding to receiving a UEOM from a user endpoint by:
      accepting the UEOM when the first work load information indicates first border element work load below a first threshold; and
      when the first work load information indicates the work load of the first border element is above the first threshold and below a second threshold, determining whether to accept the UEOM or redirect the UEOM to a second border element based at least in part on a predetermined throttling factor, wherein a percentage of UEOMs accepted is based on the throttling factor.

2. The method of claim 1, wherein maintaining the first work load information includes maintaining work load information selected from the list consisting of registered user work load information indicative of a number of user endpoints currently registered with the first border element, active call work load information indicative of a number of active calls supported by the first border element, and central processor work load information indicative of a work load of a central processor of the first border element.

3. The method of claim 2, wherein the first work load information includes overall work load information based on the registered user work load information, active call work load information, and central processor work load information.

4. The method of claim 3, wherein the overall work load information comprises a maximum of the registered user work load information, active call work load information, and central processor work load information.

5. The method of claim 1, wherein the first border element work load is a normalized expression.

6. The method of claim 1, wherein the determining is also based at least in part on whether the UEOM is a registration request.

7. The method of claim 1, further comprising sending the first work load information to the second border element.

8. The method of claim 7, further comprising responding to receiving the second work load information by incorporating the second work load information into a work load information data structure including the first work load information and the second work load information.

9. The method of claim 8, further comprising storing the work load information data structure in a storage resource of the first border element.

10. The method of claim 1, wherein the second work load information is indicative of second border element work load of a plurality of second border elements.

11. The method of claim 10, further comprising sending the first work load information to the second border elements by multicasting the first work load information to a multicast group comprising the plurality of second border elements.

12. The method of claim 1, wherein the determining includes redirecting the UEOM only if the second border element work load is less than the first border element work load.

13. The method of claim 12, wherein the second work load information is indicative of second border element work load of a plurality of second border elements and wherein the redirecting includes identifying a redirection border element from the plurality of second border elements.

14. The method of claim 1, further comprising maintaining a first work load state variable wherein a current value of the variable is based on the first border element work load and on a prior value of said variable and further wherein the determining is based on a value of the first work load state variable.

15. A computer program product comprising computer executable instructions, stored on a computer readable medium, for registering a user endpoint with a session border controller in a communication network, comprising instructions to:
   maintain a work load information data structure containing first work load information indicative of a work load for a first session border controller and second work load information indicative of work load for a second session border controller;
   send, from time to time, the first work load information to the second session border controller; and
   respond to receiving a user endpoint originated message (UEOM) from a user endpoint by determining whether to accept the UEOM for first session border controller processing or redirect the UEOM to the second session border controller based on information in the work load information data structure;
   wherein the instructions to respond comprise instructions to:
      accept the UEOM for first border element processing if the work load of the first session border controller is below a first threshold; and
      accept a specified percentage of the UEOM for first border element processing when the work load of the first session border controller is above the first threshold, but lower than a second threshold.

16. The computer program product of claim 15, wherein the work load information data structure includes a first work load state variable indicative of a work load state of the first border element and a second work load state variable indicative of a work load state of the second session border controller and wherein the determining is based on values of the first work load state variable and the second work load state variable.

17. The computer program product of claim 15, wherein the instructions to send comprise instructions to multicast the first work load information to a session border controller multicast group comprising the first border element and a plurality of second border elements.

18. The computer program product of claim 17, wherein the instructions to respond comprise instructions to respond to a Session Initiation Protocol compliant UEOM.

19. The computer program product of claim 15, wherein the instructions to respond comprise instructions to redirect the UEOM only if the second border element work load is less than the first border element work load.

20. The computer program product of claim 16, further comprising instructions to reject the UEOM when the first border element work load and the second border element work load exceed a third threshold.

21. A border element operable for use in establishing a communication session, comprising:
   a processor;
   a network interface adapter operable to enable communication between the processor and a communication network; and
   a computer readable storage resource, accessible to the processor, including instructions to:
   periodically send first work load information to a plurality of second border elements, wherein the first work load information is indicative of a registration capacity of a first border element;
   respond to receiving second work load information from at least one of the second border elements by incorporating the second work load information into a work load information data structure, wherein the second work load information is indicative of a registration capacity of a second border element; and
   respond to receiving a user endpoint originated message (UEOM) from a user endpoint by determining, based on work load information in the work load information data structure, to accept the UEOM for first border element processing or redirect the UEOM to a second border element for second border element processing
   wherein the instructions to respond to receiving the UEOM comprise instructions to:
      accept the UEOM for first border element processing if the registration capacity of the first border element is below a first threshold; and
      accept a specified percentage of the UEOM for first border element processing when the registration capacity of the first border element work load is above the first threshold, but lower than a second threshold.

22. The border element of claim 21, wherein the first border element comprises a Session Initiation Protocol (SIP) compliant session border controller, and the communication network comprises a SIP compliant Voice over Internet network.

23. The border element of claim 22, further comprising instructions to respond to determining to redirect the UEOM by sending a SIP compliant redirect message to the user endpoint wherein a Contact field in a header of the redirect message includes a universal resource indicator corresponding to the second border element.

* * * * *